United States Patent [19]

Colao

[11] 4,263,895
[45] Apr. 28, 1981

[54] SOLAR ENERGY RECEIVER

[75] Inventor: Angelo A. Colao, Bedford, Mass.

[73] Assignee: Sanders Associates, Inc., Nashua, N.H.

[21] Appl. No.: 842,704

[22] Filed: Oct. 17, 1977

[51] Int. Cl.³ .............................................. F24J 3/02
[52] U.S. Cl. .................................. 126/438; 126/450; 126/452; 60/641
[58] Field of Search ............... 126/432, 435, 438, 452, 126/440, 449, 424; 60/641, 439

[56] References Cited

U.S. PATENT DOCUMENTS

| | | | |
|---|---|---|---|
| 2,998,005 | 8/1961 | Johnston | 126/270 |
| 3,203,167 | 8/1965 | Green | 60/641 |
| 3,924,604 | 12/1975 | Anderson | 126/438 |
| 3,927,659 | 12/1975 | Blake | 126/271 |
| 3,979,597 | 9/1976 | Drucker | 126/439 |
| 3,993,041 | 11/1976 | Diggs | 126/440 |
| 4,047,517 | 9/1977 | Arnberg | 126/270 |
| 4,121,564 | 10/1978 | Schwartz | 126/450 |

OTHER PUBLICATIONS

*Silicon Carbide*–1973, ed. by Marshall, et al., Univ. of S. Car. Press, ©1974, "Non-Electronic Applications of SiC" by P. Shaffer, p. 349.

*Primary Examiner*—Carroll B. Dority, Jr.
*Assistant Examiner*—Lee E. Barrett
*Attorney, Agent, or Firm*—Louis Etlinger; Richard I. Seligman

[57] ABSTRACT

A highly efficient, open-ended solar energy receiver is disclosed having a porous element through which air passes and a conventional heat exchanger positioned above and immediately adjacent to the porous element such that when solar energy is focused onto the porous element, a constant controlled temperature hot air stream from the element is conveyed by the temperature controlled convectively rising hot air to the conventional heat exchanger to produce steam, thereby minimizing pumping requirements. The quantity of air flowing through the receiver is regulated, if desired, by a low-power exhaust fan operating at a relatively low temperature due to the removal of heat by the heat exchanger. Regulation may also be obtained by an opening at the top of the receiver, controlled in such a manner as to vary the air flow through the system to maintain a constant temperature output from the heat exchanger. Additionally, if desired, water flow control may be utilized to maintain the proper energy balance.

16 Claims, 2 Drawing Figures

SOLAR ENERGY RECEIVER

FIELD OF INVENTION

This invention relates to solar receivers and more particularly to openended solar receivers adapted for steam generation in which solar energy is first utilized to heat a solar absorber in the form of a porous member adjacent to a conventional steam boiler or like heat exchanger located above the porous member.

BACKGROUND OF THE INVENTION

As illustrated in U.S. Pat. No. 3,924,604 issued to Donald E. Anderson, on Dec. 9, 1975, it is known to provide a solar energy receiver on the top of a mast, below which is provided a mirror field which includes a number of mirrors which redirect incoming solar radiation and focus it onto the solar receiver. In this patent ingested air is pumped from the top of the tower to the bottom of the tower and thence to a boiler which provides a mechanism for transferring the focused solar energy into usable energy by virtue of fluid heated in the boiler.

One of the outstanding problems in this type system is the necessity of pumping the air from the receiver down through the tower to a subsurface boiler, which pumping energy is considerable.

In the Anderson patent it is further noted that louvers are heated by focused solar radiation. The heating of louvers is, to a certain extent, inefficient when coupled with the amount of flow necessary to remove the heat from the louvers and then transfer this energy down to the base of the tower which may be on the order of several hundred feet high.

In the subject invention the heat exchanger, rather than being located at some distance from the point at which solar radiation is focused, is placed above a porous high-temperature absorbing material at or near the focus of the solar radiation. The receiver in one embodiment is an open-ended device which includes a cavity having an opening and a porous body member or element positioned at or near the opening. Heat from the porous body is transmitted to a conventional steam-type heat exchanger which is positioned above and adjacent to the porous body primarily by virtue of the convectively-rising hot air. In one embodiment, temperature control is obtained by regulation of an exhaust fan, while in another embodiment control is obtained by a variable orifice at the top of the receiver. When an exhaust fan is used, pumping energy expended by the exhaust fan utilized is minimal because of the convectively rising hot air and the particular position of the heat exchanger above the heated porous body.

Other types of steam generating plants employing a receiver mounted on a tower are exemplified by U.S. Pat. No. 3,927,659 issued to Floyd A. Blake et al on Dec. 23, 1975, in which a closed receiver having a window employs heat exchanger tubes within the body of the receiver to convert the solar energy into steam. Here no porous member is employed. However, it is notable that in this patent at column 1, lines 38 through 43, it is said that "convection problems have been minimized to some extent by locating the boiler super heater units above the reflection mirror field with the cavity or conversion chamber at the bottom of the unit and facing vertically the mirror field, and while this trapped, to some extent, hot air from convection in the chamber, this adversely limits the physical plant and results only in minimizing to some degree convection losses." Thus, as exemplified by this patent, the use of convection as the means of transferring solar energy was avoided and was generally thought to be a serious defect.

Contrary to the teaching of this patent, it has been found that by the utilization of the open ended concept, along with a heat exchanger above a porous body, transfer of energy be convection is, in fact, more efficient and, therefore, rather than being avoided is, in fact, sought. The efficiency increase comes from minimizing the pumping energy which is utilized in either one of the two above-mentioned patents and by the proximity of the boiler to the heated porous body.

One purpose of providing the porous solar absorber is to provide a controlled temperature fluid (air) as the heat exchange medium. This prevents high temperature areas from occurring on the heat exchanger due to solar energy distribution non-uniformities if the heat exchanger were to be heated directly by the focused solar radiation. It should be noted that solar radiation distributions have been measured to vary by as much as 10:1, which could burn out a directly illuminated heat exchanger. Further, a loss of coolant (water) with a direct solar impingement heat exchanger would result in very high temperature and a burnout or meltdown. In contrast, in the embodiment presented, there is a maximum controlled upper limit to the air temperature, and this upper limit is provided by the solar absorber. This, in turn, prevents heat exchanger failure or requirement for repair.

It is, therefore, the object of this invention to provide an efficient solar receiver in which pumping energy is minimized;

It is another object of this invention to provide constant temperature solar heated air to a heat exchanger regardless of solar density variations, thereby to prevent damage to the heat exchanger.

It is another object of this invention to provide the combination of an openended solar receiver utilizing a porous member and a closely spaced heat exchanger which receives the majority of its energy through flow caused by convection;

It is still further object of this invention to locate a heat exchanger above a porous body heated by focused solar radiation in which the energy from the focused solar radiation is transferred to the heat exchanger via convective currents. These and other objects will be better understood in connection with the following specifications when taken in conjunction with the following drawings.

DETAILED DESCRIPTION

Figure 1:
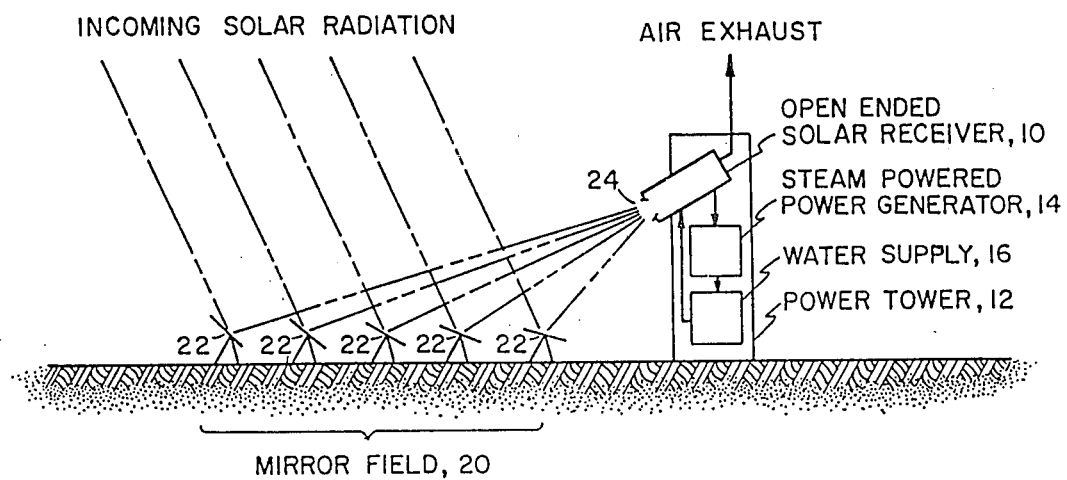
FIG. 1 illustrates diagrammatically a conventional power tower/mirror field combination illustrating the placement of the subject open-ended solar receiver.

Referring now to FIG. 1, an open-ended receiver 10 is mounted in a power tower 12 which may also house a steam powered generator 14 and water supply/pump unit 16. Alternatively, any fluid may be used. Adjacent to power tower is a mirror field 20 containing individually steerable mirror elements 22 which redirect incoming solar radiation through the aperture 24 of the open-ended solar receiver. The aperture may be smaller in diameter than the body of the receiver so that energy radiated back towards the aperture is reflected back into the receiver cavity. It is the purpose of this arrangement to heat the water from the water supply so as to supply steam to a steam-powered generator in the most efficient manner possible. As mentioned hereinbefore, this is done through convectively rising hot air as will now be described in connection with one embodiment of the subject invention shown in FIG. 2.

Figure 2:
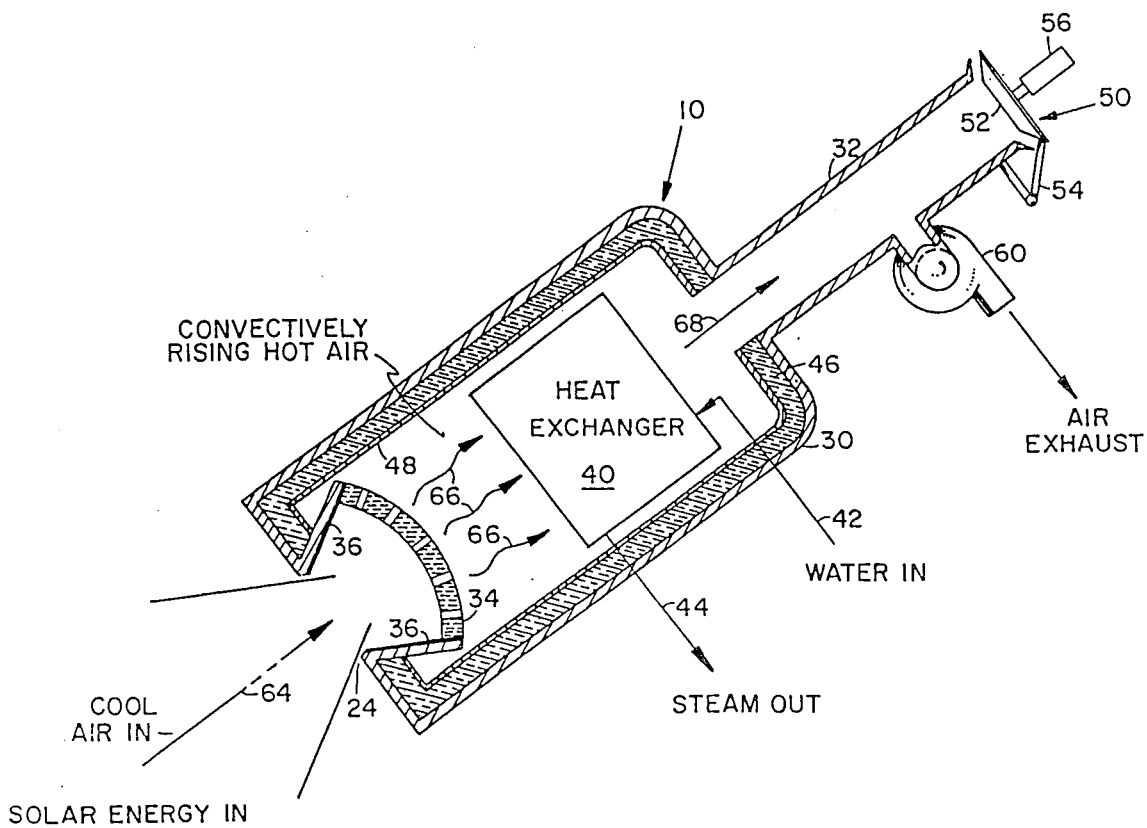
FIG. 2 is a cross-sectional and diagrammatic illustration of the subject solar energy receiver.

In FIG. 2 receiver 10 is shown to include a body portion 30 and a stack portion 32. Located at or adjacent aperture 24 is a solar absorber in the form of a porous member 34 which may be made of silicon carbide or the like. The porous member may be in the form of a bowed honeycomb in which the passages generally point towards the heat exchanger to be described hereinafter. This directs a hot air flow caused by convection to impinge on the heat exchanger. The porous member is supported by supports 36 such that focused solar energy impinges on the porous member to heat it. The porous member may be in general any ceramic material capable of withstanding the temperature involved with focused solar radiation with the position of the porous member not being particularly critical. The porous member provides a constant temperature air stream regardless of solar density variations and the temperature of this air can be made to vary by variation in the design of the porous member.

Located adjacent to the porous member and thereabove is a heat exchanger 40 which may be any type of conventional boiler. The flow of convectively rising hot air which has been heated by virtue of contact with the porous member transfers constant temperature energy from the focused sunlight onto the heat exchanger from whence it is utilized to convert water brought in on line 42 to steam. The output of the heat exchanger is shown at line 44.

The body of the heat exchanger may be insulated by insulation shown generally at 46. An interior metallic or other liner 48 may be provided as shown such that the majority of the energy focused into the receiver at its open end is captured and utilized to heat the fluid in the heat exchanger. It will be appreciated also that the fluid need not be limited to water but may be either air or other types of fluid or liquid.

In one embodiment the stack 32 may be provided with a variable orifice generally indicated at 50 which may include a cap 52 secured via a hinged arrangement generally shown at 54 and operated via solenoid 56 as desired to control the convective flow through the stack and thus the heat balance of the entire system. Alternatively or in conjunction therewith, an exhaust fan generally indicated at 60 may be utilized to control the flow of the cooler air from the heat exchanger with very little energy being expended by virtue of the exhaust fan's operation. For further heat balance control, the flow of fluid to the heat exchanger may also be controlled.

Of course, the exhaust fan may be omitted and is used herein only for maintaining the proper energy balance within heat exchanger 40.

In operation, cool air generally indicated by arrow 64 is drawn through porous member 34 due to the convective process in which the hot air in the vicinity of the porous member rises as illustrated by arrows 66. This convective rising provides a flow of low velocity through the heat exchanger and is utilized to heat the fluid passing through the heat exchanger. It should be noted that no air pumping is necessary due to the convection process and that this is a major feature of the subject invention.

The configuration of heat exchanger 40 at least in principle is not critical to the subject invention and may be any one of a number of type of conventional boilers. Since the air temperature to the heat exchanger is made constant and controllable by the solar absorber, heat exchanger design is considerably simplified. The cooler air which exits the heat exchanger is illustrated by arrow 68 and its flow is governed either via the variable aperture at the end of the stack or by the exhaust fan which, it will be appreciated, need not be subjected to extremely high temperatures and, therefore, may be of a low-cost variety.

What has, therefore, been provided is an extremely efficient low-cost solar energy receiver in which convectively rising hot air is utilized as the transfer medium for transferring energy from focused sunlight to a fluid in the heat exchanger. Due to the proximity of the heat exchanger to the porous member and due to its location thereabove, problems of convectively lost energy mentioned hereinbefore are alleviated and are put to advantage rather than being viewed as a detriment to the system. Moreover, heat exchanger burnout is prevented by use of the solar absorber and its design is simplified.

Although a preferred embodiment of the invention has been described in considerable detail for illustrative purposes, many modifications will occur to those skilled in the art, which modifications are within the spirit of the invention. It is, therefore, desired that the protection afforded by Letters Patent be limited only by the true scope of the appended claims.

I claim:

1. A solar energy receiver for use with focused solar energy, comprising:
   a body having an opening at one end through which focused solar radiation is adapted to pass, and exhaust means at the opposite end thereof,
   a porous member capable of withstanding said focused radiation, means for mounting said porous member adjacent the opening of said body,
   a heat exchanger means, and
   means for mounting said heat exchanger means between said porous member and said exhaust means above and proximate to said porous member such that energy is transferred to said heat exchange means by convectively rising hot air.

2. The receiver of claim 1 wherein said exhaust means includes means for controlling exhaust air thereby to control the energy balance of the system.

3. The receiver of claim 2 wherein said control means includes variable orifice means.

4. The receiver of claim 2 wherein said control means includes exhaust fan means.

5. The receiver of claim 1 wherein said porous member is made of silicon carbide.

6. The receiver of claim 1 wherein said porous member has a honeycomb structure in which the channels of the honeycomb point in the direction of said heat exchanger means.

7. The receiver of claim 1 and further including fluid storage means including means for pumping fluid in said fluid storage means to said heat exchanger means, and power generating means coupled to said heat exchanger means and run by the fluid heated by said heat exchanger means.

8. The receiver of claim 1 and further including a mirror field and means for mounting said receiver above said mirror field such that said heat exchanger means is above said porous member.

9. A solar energy conversion system comprising:
  means for focusing solar energy to a predetermined location,
  an open-end receiver at said predetermined location, said open-ended receiver having exhaust means at the end opposite said open-end, a porous member at said open end positioned to receive energy focused through said open end, heat exchanger means proximate to and above said porous member such that energy from said porous member is transferred convectively to said heat exchanger means, and means for mounting said receiver such that said focused solar energy impinges on said porous member and such that said heat exchanger means is above said porous member.

10. The system of claim 9 wherein said exhaust means includes means for controlling convectively flowing air.

11. The system of claim 9 wherein said porous member has a honeycomb structure.

12. The system of claim 11 wherein the channels of said honeycomb point towards said heat exchanger means.

13. The system of claim 9 wherein said porous member is made from silicon carbide.

14. The system of claim 9 and further including a source of fluid including means for pumping said fluid through said heat exchanger means and power generating means coupled to the output of said heat exchanger means for utilizing the heated fluid therefrom to generate power.

15. A method of preventing heat exchanger burnout for heat exchangers which obtain energy from focused solar energy comprising the steps of:
  providing an open-ended solar receiver body having an outlet port opposite the open end with a heat exchanger located therein, and
  positioning a porous solar energy absorber below the heat exchanger and between the open end and the heat exchanger to intercept all of said focused solar energy, whereby constant temperature heated air is convectively transferred to the heat exchanger thereby to prevent burnout.

16. A method of providing constant temperature solar heated hot air to a heat exchanger which obtains energy from focused solar energy comprising the steps of:
  providing an open-ended solar receiver body having an outlet port opposite the open end with a heat exchanger located therein, and
  positioning a porous solar energy absorber below the heat exchanger and between the open end and the heat exchanger to intercept all of said focused solar energy, whereby constant temperature heated air is convectively transferred to the heat exchanger.

* * * * *